US012572666B2

(12) United States Patent
Parekh

(10) Patent No.: US 12,572,666 B2
(45) Date of Patent: Mar. 10, 2026

(54) METHODS, SYSTEMS, AND DEVICES FOR STORING, ENCRYPTING, AND REPLACING DATA

(71) Applicant: MIRAGE DATA, INC., Duluth, GA (US)

(72) Inventor: Sanjay Parekh, Duluth, GA (US)

(73) Assignee: MIRAGE DATA, INC., Duluth, GA (US)

( * ) Notice: Subject to any disclaimer, the term of this patent is extended or adjusted under 35 U.S.C. 154(b) by 247 days.

(21) Appl. No.: 18/031,439

(22) PCT Filed: Oct. 7, 2021

(86) PCT No.: PCT/US2021/053924
§ 371 (c)(1),
(2) Date: Apr. 12, 2023

(87) PCT Pub. No.: WO2022/081408
PCT Pub. Date: Apr. 21, 2022

(65) Prior Publication Data
US 2023/0376612 A1     Nov. 23, 2023

Related U.S. Application Data

(60) Provisional application No. 63/090,767, filed on Oct. 13, 2020.

(51) Int. Cl.
*G06F 21/60*     (2013.01)
*G06F 21/62*     (2013.01)

(52) U.S. Cl.
CPC ........ *G06F 21/602* (2013.01); *G06F 21/6245* (2013.01)

(58) Field of Classification Search
CPC ........................... G06F 21/602; G06F 21/6245
USPC ........................................ 713/181, 193, 180
See application file for complete search history.

(56) References Cited

U.S. PATENT DOCUMENTS

| | | | |
|---|---|---|---|
| 6,516,412 B2 * | 2/2003 | Wasilewski | H04N 7/162 713/168 |
| 8,458,487 B1 * | 6/2013 | Palgon | G06F 21/6254 713/193 |
| 10,541,981 B1 * | 1/2020 | Conley | H04W 12/02 |
| 2008/0091946 A1 | 4/2008 | Paulsen, Jr. et al. | |
| 2009/0138712 A1 * | 5/2009 | Driscoll | H04L 9/12 713/170 |
| 2020/0294635 A1 * | 9/2020 | Blum | G06F 21/6254 |
| 2021/0028941 A1 * | 1/2021 | Aizikovich | H04L 9/0866 |
| 2021/0306139 A1 * | 9/2021 | Wright | H04L 9/0869 |
| 2022/0360446 A1 * | 11/2022 | Dunjic | H04L 9/3213 |
| 2022/0405366 A1 * | 12/2022 | Heuman | G06V 40/40 |

OTHER PUBLICATIONS

NPL Search Terms (Year: 2025).*

* cited by examiner

*Primary Examiner* — Syed A Zaidi
(74) *Attorney, Agent, or Firm* — TROUTMAN PEPPER LOCKE LLP; James E. Schutz; Brandon M. Reed

(57)     ABSTRACT

A system configured to: accept a data field from a calling service, application, or user; and generate a token or replacement data field for use by the caller instead of the actual data field.

16 Claims, 10 Drawing Sheets

Encryption Database 120

Encryption Server 110

Organization Device 190

100

200

300

400

<u>600</u>

Receive OUD (e.g., <real@original.example.com>) —610

Generate TED (e.g., <56789@token.com>) —620

Send TED —630

Hash TED (e.g., "12365") —640

Encrypt OUD (e.g., "lod982njASD~!") —650

Store TED hash and encrypted OUD —660

Delete TED and OUD —670

700

800

METHODS, SYSTEMS, AND DEVICES FOR STORING, ENCRYPTING, AND REPLACING DATA

CROSS-REFERENCE TO RELATED APPLICATIONS

This application claims the benefit of U.S. Provisional Application No. 63/090,767 filed Oct. 13, 2020, the entire disclosure of which is incorporated by reference hereon as if set forth in full below.

FIELD

The present disclosure relates generally to information technology security, and more particularly to managing and using data via encryption.

BACKGROUND

Companies and organizations collect various types of sensitive data. For example, contact information (e.g., email addresses) and other personal information are routinely collected and stored by various businesses. However, organizations are at a constant threat of being breached by malicious parties whose goal is to access and use an organization's collected data.

Related art approaches implement security measures to prevent system access by third parties (e.g., firewalls) as well as the use of data encryption. The related art suggests using encryption keys to secure data within an organization's servers. However, these approaches are insufficient. For example, poorly implemented security technology or decryption keys being held within the organization together with the encrypted data leaves companies open to breaches. Thus, once a hacker has breached an organization and can access encrypted data, they often can easily access decryption keys to decrypt the data as well.

Accordingly, there is needed improved methods and systems for preventing access to data in the event of a breach. This system can be applied to other data to allow secure, encrypted storage while allowing transparent usage of the data. Aspects of the present disclosure attempt to address these and other issues.

SUMMARY

According to some embodiments, there is provided a system configured to: accept a data field from a calling service, application, or user; and generate a token or replacement data field for use by the caller instead of the actual data field.

According to some embodiments, there is provided a system configured to generate a token or replacement data field on demand.

According to some embodiments, there is provided a method of a device comprising: receiving, from a remote device, original data to be encrypted; generating a replacement token for the original data; sending, to the remote device, the replacement token; encrypting the original data; and storing the encrypted original data in association with the replacement token.

According to some embodiments, there is provided a method of a device comprising: receiving, from a remote device, a replacement token to be de-obfuscated; identifying an encrypted original data based on the replacement token; decrypting the original data; and sending, to the remote device, the original data.

According to some embodiments, there is provided a method of a device comprising: receiving, from a remote device, an email directed to a token email address; identifying an encrypted true email address based on the token email address; decrypting the true email address; and updating the email by replacing, within the email, the token email address with the email address; and forwarding the updated email to the true email address.

According to some embodiments, there is provided a method of a device comprising: receiving, from a remote device, an identifier to be de-obfuscated; identifying an encrypted token based on the identifier; decrypting the token; and sending, to the remote device, the unencrypted token.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Certain features of one or more example embodiments are described below with reference to one or more figures. It will be understood by one of ordinary skill that many alterations may be made to the described embodiments without departing from the scope of the present disclosure.

According to aspects of the present disclosure, there may be provided a method for securely encrypting and/or obfuscating data. For example, there may be provided an encryption server that receives an email address from an organization. The encryption server generates a token replacement email address and provides the token email address to the organization. The organization can use the token address instead of the email address (i.e., the organization can delete all records of the true email address), and swap out the token email address for the real email address as needed by communicating with the encryption server. The encryption server encrypts the real address and associates the encrypted address with the token address using a hash of the token address. The encryption server can then remove all instances of the token address and the unencrypted real address from its database. When the organization wants the true address, it provides the encryption server with the token address. The encryption server then hashes the token address to locate the encrypted address, decrypts the encrypted address, and provides the unencrypted address to the organization. By splitting the token address and the encryption, only infiltration of both the organization (e.g., knowing the token address) and the encryption server (e.g., having access to the database) could any records be compromised.

Reference will now be made to the figures to explain certain aspects of the present disclosure. Although examples are generally discussed with reference to email addresses, this is merely an example. One of ordinary skill would recognize, in light of the present disclosure, that various types of data could be protected utilizing aspects of the present disclosure.

Figure 1:
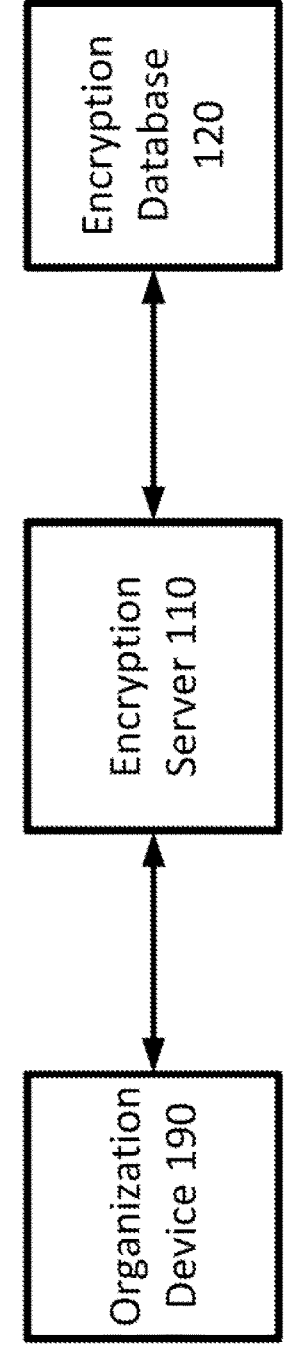
FIG. 1 illustrates an example environment in which one or more aspects of the present disclosure may be implemented.

FIG. 1 illustrates an example environment 100 in which one or more aspects of the present disclosure may be implemented. The example environment includes an encryption server 110, an encryption database 120, and an organization device 190. One or more of encryption server 110, encryption database 120, and organization device 190 may be implemented within one or more computer system architectures, for example, as described below with reference to FIG. 10.

Encryption server 110 and encryption database 120 may provide a data token service (e.g., a Mirage Data™ Token Service or "MDTS"). Organization device 190 may be associated with an organization that subscribes to use the MDTS.

Organization device 190 may maintain or have access to data (e.g., personally identifiable information, which may contain an email address or other user information) that needs to be protected from being misused, stolen, or otherwise disclosed. This data may relate to the organization's customers, vendors, employees, or any other individual or group of individuals. Organization device 190 would provide unencrypted forms of the data (e.g., original unencrypted data ("OUD")) to the encryption server 110. For example, organization device 190 may provide the OUD through an API, a spreadsheet, or some other method. The encryption server 110 would then process each OUD (e.g., each email) in order to provide token encrypted data ("TED") (e.g., a token email address) to replace the OUD in the organization device 190.

Encryption server 110 could generate the TED using a random, pseudo-random, or ordered process. For example, if the OUD was an email address <real@original.example.com> the TED may be <blue-plate-3851@token.example.com> or <56789@token.com>. Thus, there may be no obvious connection between the OUD and the TED.

Organization device 190 can replace all instances of the OUD stored within the organization with the TED. Organization device 190 would no longer hold the OUD and thus, even if the organization were ever breached by a malicious actor, the stored data would not correspond to the actual data. In the case of an email address, the email address would be TED address processable by encryption server 110 and not a consumer's email address.

In order to map the OUD and TED, encryption server 110 may use a hash function which to convert the TED. The hash function may convert the TED to a numeric or alphanumeric representation with a very low or zero probability of collisions. The hash function may be a one-way function (e.g., a function where the output of the function is relatively easy to compute but using the hash output to determine the original data is computationally difficult or impossible). The encryption server 110 stores a hash of the TED with an encrypted form of the OUD in encrypted database 120 to identify the record to convert from the TED to the OUD for delivery. This allows for a record to be identified without the encrypted server 110 from knowing the TED.

Encryption server 110 may encrypt the OUD using, for example, a key that is either provided by the service subscriber using the service or is implicit within the request. For example, the TED may be used as the key for the encryption algorithm to encrypt the OUD. The TED may also be used to decrypt the OUD. In some cases, an IP address or some unique identifier of organization device 190 that cannot be easily assumed by a malicious actor could be used to encrypt that data. In some cases, two or more pieces of unique data could be used to encrypt the data. Given a sufficiently strong encryption algorithm, it would be difficult (or impossible within a reasonable time-frame) to decrypt the data payload without the related key and because the TED is not stored within the encryption server 110 or the encryption database 120 in an unencrypted or unhashed form. Thus, the encryption database 120 could not be decrypted if it was compromised by a malicious actor. In some cases, each record with the MDTS may be encrypted with a unique key, making the encryption database 120 more secure.

In some cases, encryption server 110 may be an email server that accepts and sends emails. Organization device 190 may send an email to the TED email address, which can be received by encryption server 110. Encryption server 110 may receive the email, identify the TED, and hash the TED to identify the encrypted OUD within encryption database 120. Utilizing the TED or some other key, encryption server 110 decrypts the OUD, replaces the TED within the email with the OUD, and forwards the email to the user. All traces of the TED may be removed from the email prior to sending.

In some cases, encryption database 120 may also store a hash of the OUD and an encrypted form of the TED. When an email is sent to the organization, it may be received by encryption server 110. Encryption server 110 may receive the email, identify the OUD, and hash the OUD to identify the encrypted TED within encryption database 120. Utilizing the OUD or some other key, encryption server 110 decrypts the TED, replaces the OUD within the email with the TED, and forwards the email to the organization device 190. All traces of the OUD may be removed from the email prior to sending to the organization device 190.

Tables 1 and 2 illustrate example database structures for encrypted database 120 according to some examples. As can be seen, Table 1 illustrates a structure with a one-way identifier of TED (using a hash) to encrypted OUD, while Table 2 illustrates a structure of one-way identifiers with both TED (using a hash) to encrypted OUD and OUD (using a hash) to encrypted TED. However, these are merely examples, and one of ordinary skill would recognize that various alternative data structures would be considered within the scope of the present disclosure.

TABLE 1

| TED Hash | Encrypted OUD |
| --- | --- |
| <H><TED1> | <E><OUD1> |
| <H><TED2> | <E><OUD2> |
| <H><TED3> | <E><OUD3> |
| <H><TED4> | <E><OUD4> |
| <H><TED5> | <E><OUD5> |
| <H><TED6> | <E><OUD6> |
| <H><TED7> | <E><OUD7> |

TABLE 2

| Hash | Encrypted |
| --- | --- |
| <H><TED1> | <E><OUD1> |
| <H><TED2> | <E><OUD2> |
| <H><TED3> | <E><OUD3> |
| <H><TED4> | <E><OUD4> |
| <H><TED5> | <E><OUD5> |
| <H><TED6> | <E><OUD6> |
| <H><TED7> | <E><OUD7> |
| <H><OUD1> | <E><TED1> |
| <H><OUD2> | <E><TED2> |
| <H><OUD3> | <E><TED3> |
| <H><OUD4> | <E><TED4> |
| <H><OUD5> | <E><TED5> |
| <H><OUD6> | <E><TED6> |
| <H><OUD7> | <E><TED7> |

Figure 2:
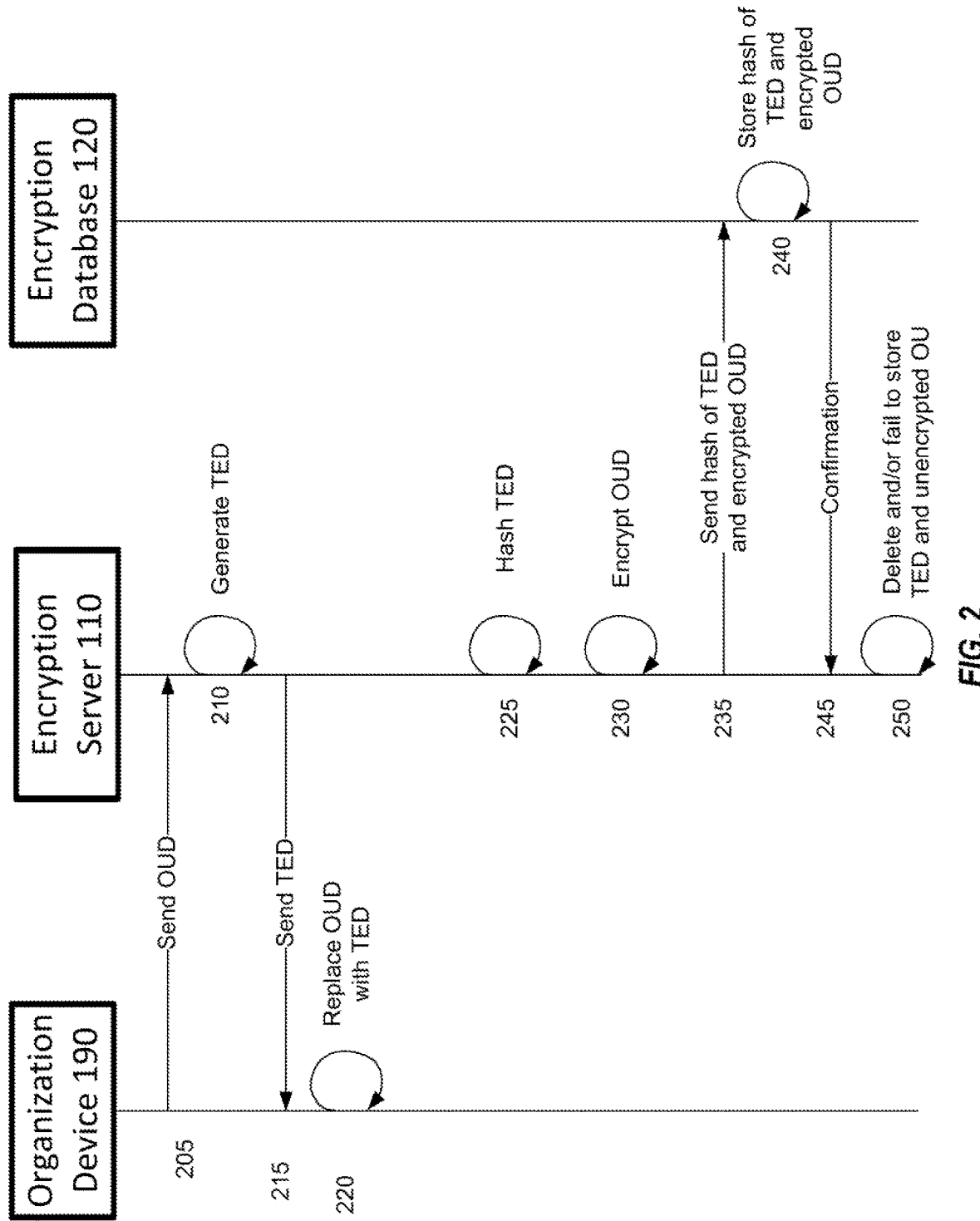
FIGS. 2-5 are timing diagrams illustrating aspects of the present disclosure.

FIG. 2 is a timing diagram 200 of a data encryption method according to an example embodiment. Organization device 190 sends 205 an OUD to encryption server 110. Encryption server 110 generates 210 a TED for the OUD and sends 215 the TED to organization device 190. Organization device 190 replaces 220 the OUD with the TED in its systems. For example, once complete, organization device 190 may not store any copies of the OUD.

Encryption server 110 generates 225 a hash of the TED and encrypts 230 the OUD. The hash function may convert the TED to a numeric or alphanumeric representation with a very low or zero probability of collisions. The hash function may be a one-way function (e.g., a function where the output of the function is relatively easy to compute but using the hash output to determine the original data is computationally difficult or impossible). The encryption may be a two-way encryption using various keys. For example, the TED could be used as an encryption key of the OUD. In some cases, an IP address or unique identifier of organization device 190 that cannot be easily assumed by a malicious actor could be used to encrypt that data. In some cases, two or more pieces of unique data could be used to encrypt the data. In some cases, the key may be specified by organization device 190. Thus, the encryption database 120 could not be decrypted if it was compromised by a malicious actor.

The TED hash links the encrypted OUD with the TED without requiring persistent knowledge of the TED. Encryption server 110 sends 235 the TED hash and the encrypted OUD to the encryption database 120. Encryption database stores 240 the TED hash associated with the encrypted OUD (e.g., the TED hash serves as a data key for the encrypted OUD). Encryption database send 245 a confirmation to encryption server 110, which deletes 250 the TED and unencrypted OUD.

Figure 3:
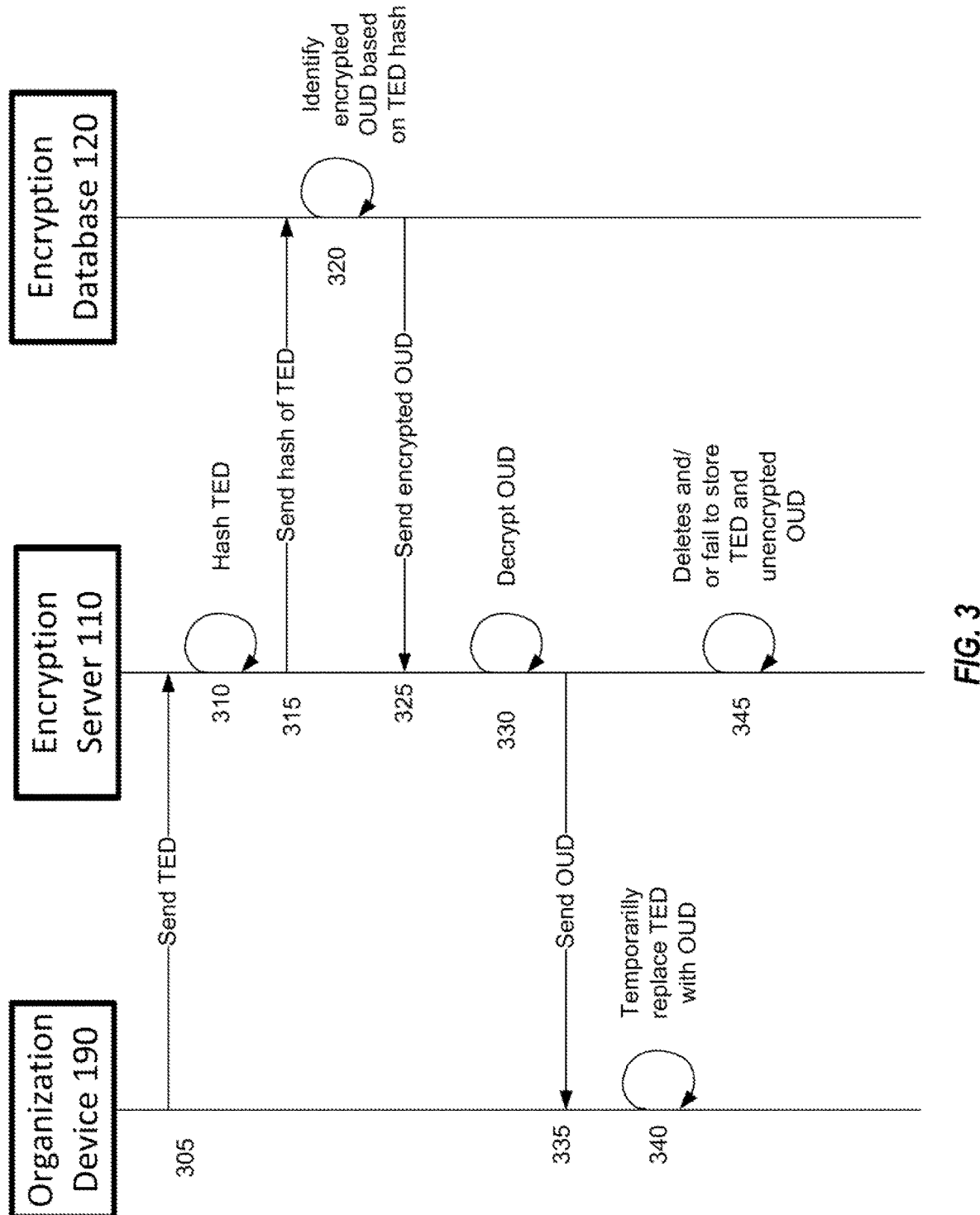

FIG. 3 is a timing diagram 300 of a data access method according to an example embodiment. Organization device 190 sends 305 a TED to encryption server 110. Encryption server 110 generates 310 a hash of the TED and sends 315 the TED hash to encryption database 120. Encryption database 120 uses the TED hash (e.g., as a database key) to identify 320 an encrypted OUD related to the TED. Encryption database 120 sends 325 the encrypted OUD to encryption server 110.

Encryption server 110 decrypts 330 the OUD. For example, the TED may serve as a decryption key for the encrypted OUD. Additionally or alternatively, an identifier of organization device 190 may be used as an encryption key. For example, an IP address or unique identifier of organization device 190 that cannot be easily assumed by a malicious actor could be used to decrypt that OUD.

Encryption server 110 sends 335 the OUD to organization device 190, which temporarily replaces 340 the TED with the OUD. Once it is no longer needed, organization device may again replace the OUD with the TED and delete all instances of the OUD. Similarly encryption server 110 may delete 345 all copies of the TED an unencrypted OUD from its systems.

Figure 4:
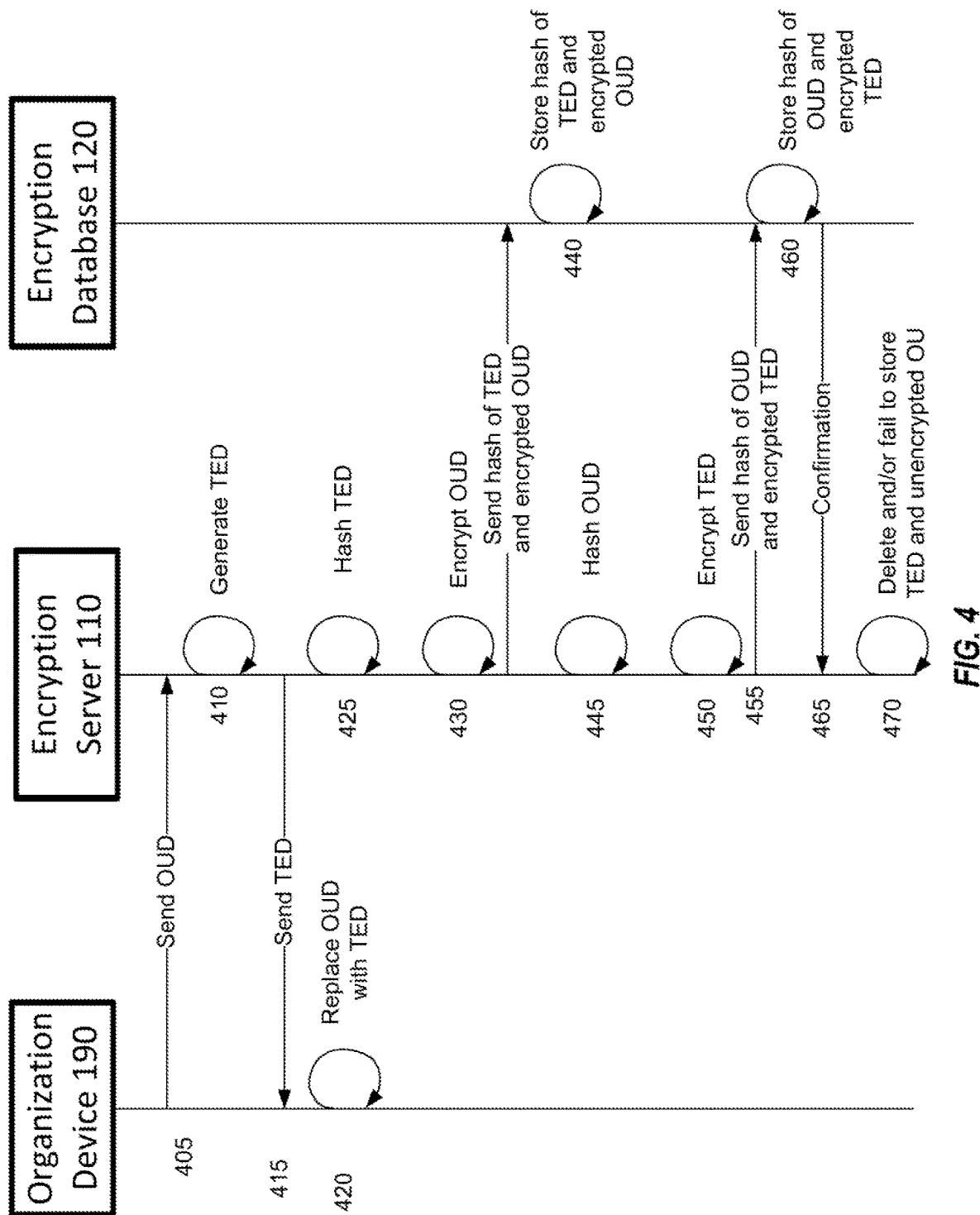

FIG. 4 is a timing diagram 400 of a data encryption method according to an example embodiment. Organization device 190 sends 405 an OUD to encryption server 110. Encryption server 110 generates 410 a TED for the OUD and sends 415 the TED to organization device 190. Organization device 190 replaces 420 the OUD with the TED in its systems. Encryption server 110 generates 425 a hash of the TED and encrypts 430 the OUD. Encryption server 110 sends 435 the TED hash and the encrypted OUD to the encryption database 120. Encryption database stores 440 the TED hash associated with the encrypted OUD. The actions discussed with reference to reference numbers 405-440 may eb substantially similar to similar elements discussed above with reference to FIG. 2.

Further, encryption server 110 generates 445 a hash of the OUD and encrypts 450 the TED. The hash function may convert the OUD to a numeric or alphanumeric representation with a very low or zero probability of collisions. The hash function may be a one-way function (e.g., a function where the output of the function is relatively easy to compute but using the hash output to determine the original data is computationally difficult or impossible). The hash function may be a same hash function as that used to hash 225 the TED. The encryption may be a two-way encryption using various keys. For example, the OUD could be used as an encryption key of the TED. In some cases, two or more pieces of unique data could be used to encrypt the data. Thus, the encryption database 120 could not be decrypted if it was compromised by a malicious actor.

The OUD hash links the encrypted TED with the OUD without requiring persistent knowledge of the TED or OUD. Encryption server 110 sends 255 the OUD hash and the encrypted TED to the encryption database 120. Encryption database stores 260 the OUD hash associated with the encrypted TED (e.g., the OUD hash serves as a data key for the encrypted OUD). Encryption database sends 265 a confirmation to encryption server 110, which deletes 270 the TED and unencrypted OUD.

Figure 5:
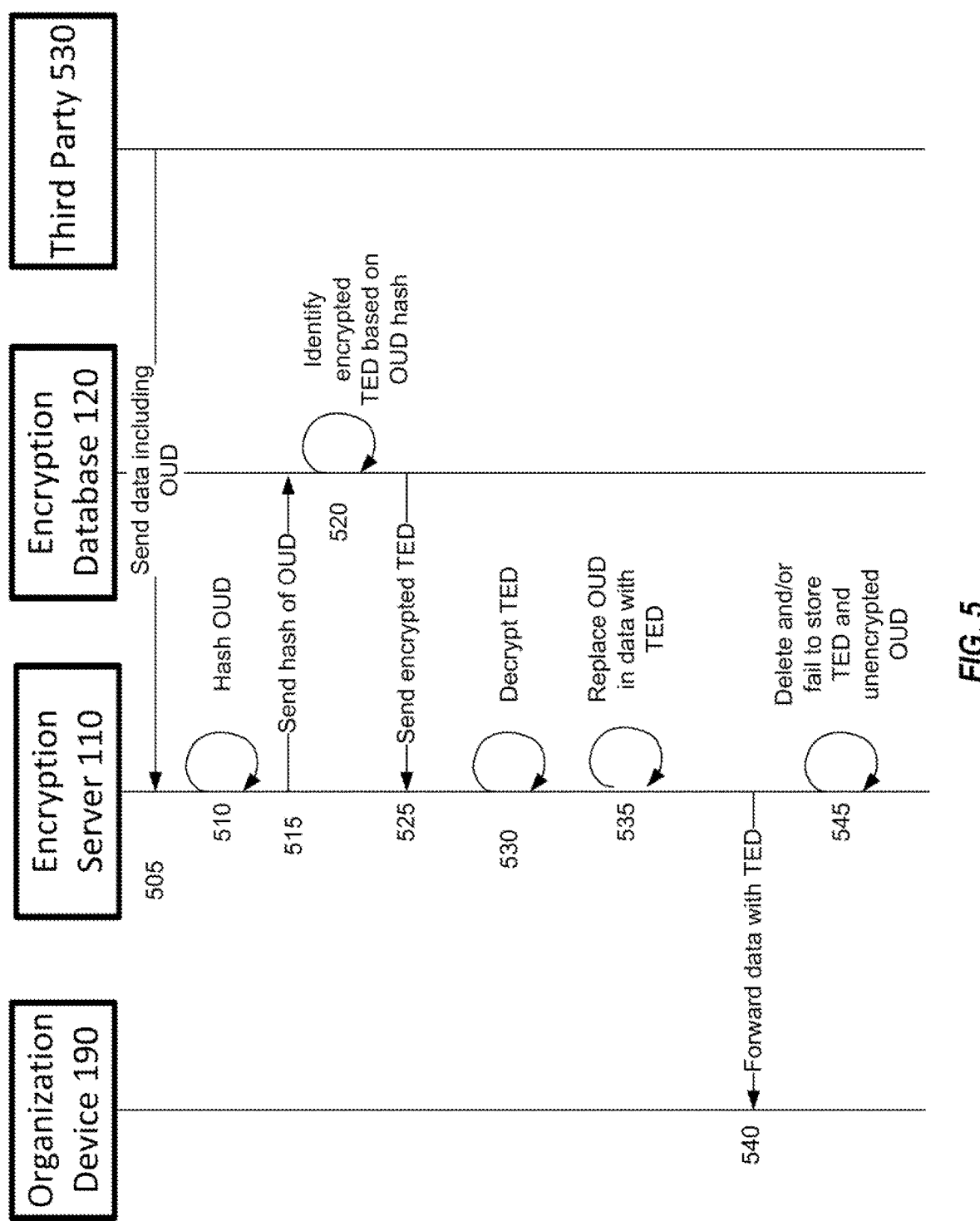

FIG. 5 is a timing diagram 500 of a data replacement method according to an example embodiment. A third party device 585 sends 505 data including an OUD to encryption server 110. For example, encryption server 110 may be an email server and third party device 585 may send an email to an address associated with encryption server 110 (e.g., directed to organization device 190). Encryption server 110 generates 510 a hash of the OUD and sends 515 the OUD hash to encryption database 120. Encryption database 120 uses the OUD hash (e.g., as a database key) to identify 520 an encrypted TED related to the OUD. Encryption database 120 sends 525 the encrypted TED to encryption server 110.

Encryption server 110 decrypts 530 the TED. For example, the OUD may serve as a decryption key for the encrypted TED. Encryption server 110 replaces 535 the OUD in the data with the decrypted TED and sends 540 the data to organization device 190 Encryption server 110 then may delete 545 all copies of the TED an unencrypted OUD from its systems.

Figure 6:
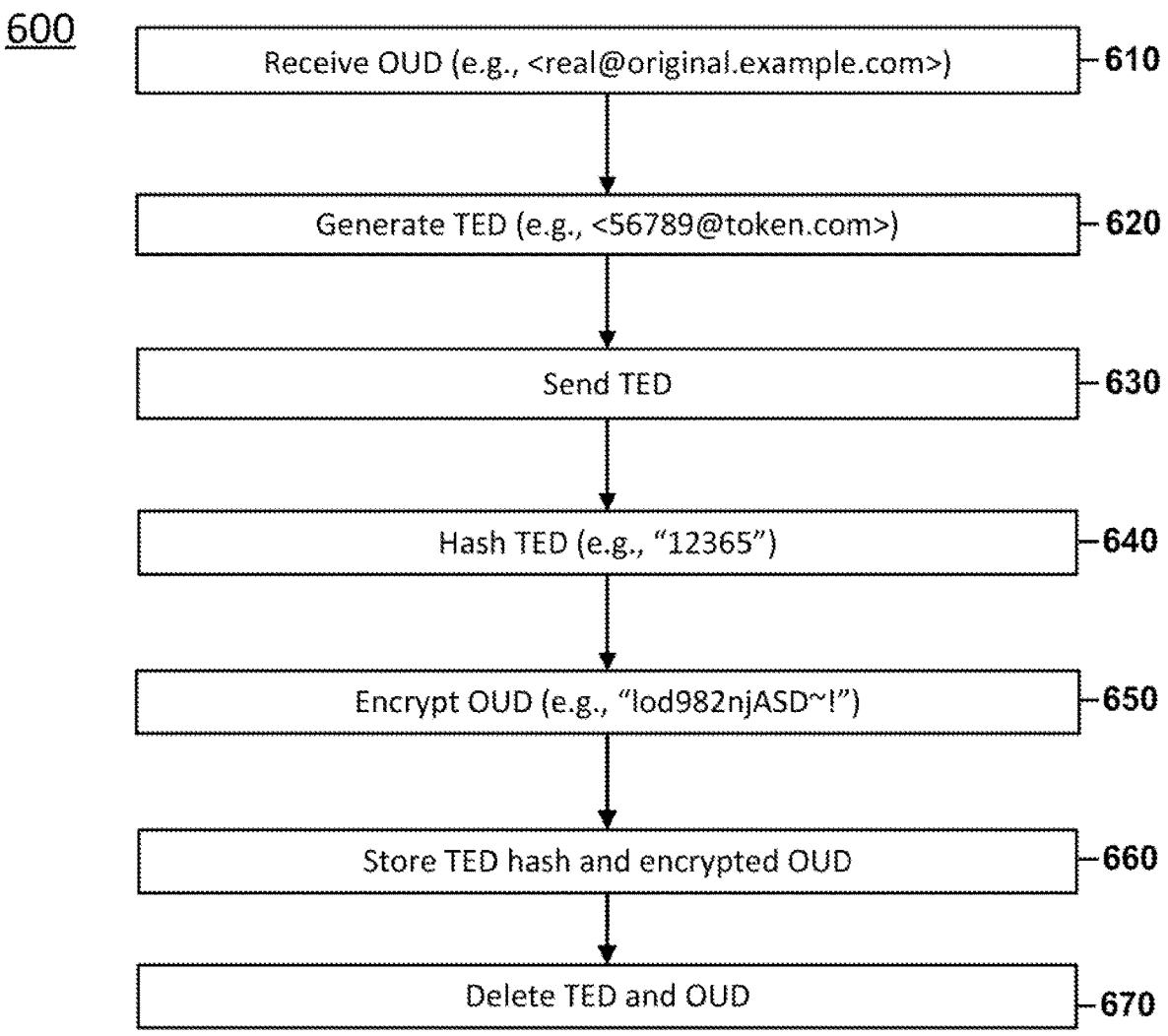
FIG. 6 is a flowchart of a data encryption method according to aspects of the present disclosure.

FIG. 6 is a flowchart 600 of a data encryption method according to an example embodiment. As a non-limiting example, the method may be performed by encryption server 110. At 610, encryption server 110 receives an OUD, e.g., receives <real@original.example.com> from organization device 190. At 620, encryption server 110 generated a TED, e.g., generates <56789@token.com>. At 630 encryption server 110 sends the TED (e.g., <56789@token.com>) to organization device 190.

At 640, encryption server 110 hashes the TED (e.g., <H><56789@token.com>-->"12365"). At 650, encryption server 110 encrypts the OUD (e.g., <E><real@original.example.com>-->"lod982njASD~!"). At 660, encryption server 110 stores the TED hash ("12365") in association with the encrypted OUD ("lod982njASD~!"). For example, the TED can serve as a data key for the encrypted OUD on encryptions database 120. At 670, the encryption server 110 deletes the TED and OUD from its systems.

Although examples have generally been described with reference to email addresses, one of ordinary skill will recognize that email addresses server merely as examples. The MDTS may be coupled with other services to provide seamless protection and usage of data. For example, the MDTS could be coupled with a phone system to create TEDs that protect phone numbers but still allow a system subscriber to continue using OUD phone numbers for customers. For example, an OUD phone number might be 212-832-2000. The MDTS could create a TED such as 760-530-5000,8645110320. In this case, a phone system attached to the phone number 760-530-5000 would accept the call and the MDTS would use all or some of the TED to find the relevant entry, using a one way hash function, and decrypt the entry in the database and forward the call to 212-832-2000.

For postal addresses, the MDTS service could be employed to protect the addresses of individual recipients. Addresses would be printed on mail that would be the TED (e.g., 725 Fifth Ave, New York, NY 10022) and a package handling service (e.g., USPS, FedEx, UPS, or others) that wants to access the OUD of the address would interface with the MDTS. The MDTS would translate the TED into the OUD (e.g., 13777 Air Expressway Blvd, Victorville, CA 92394) to allow the package handling service to correctly deliver packages to the intended recipient and location. The TED may or may not appear to be a validly configured address and may or may not map to a real world address.

Figure 7:
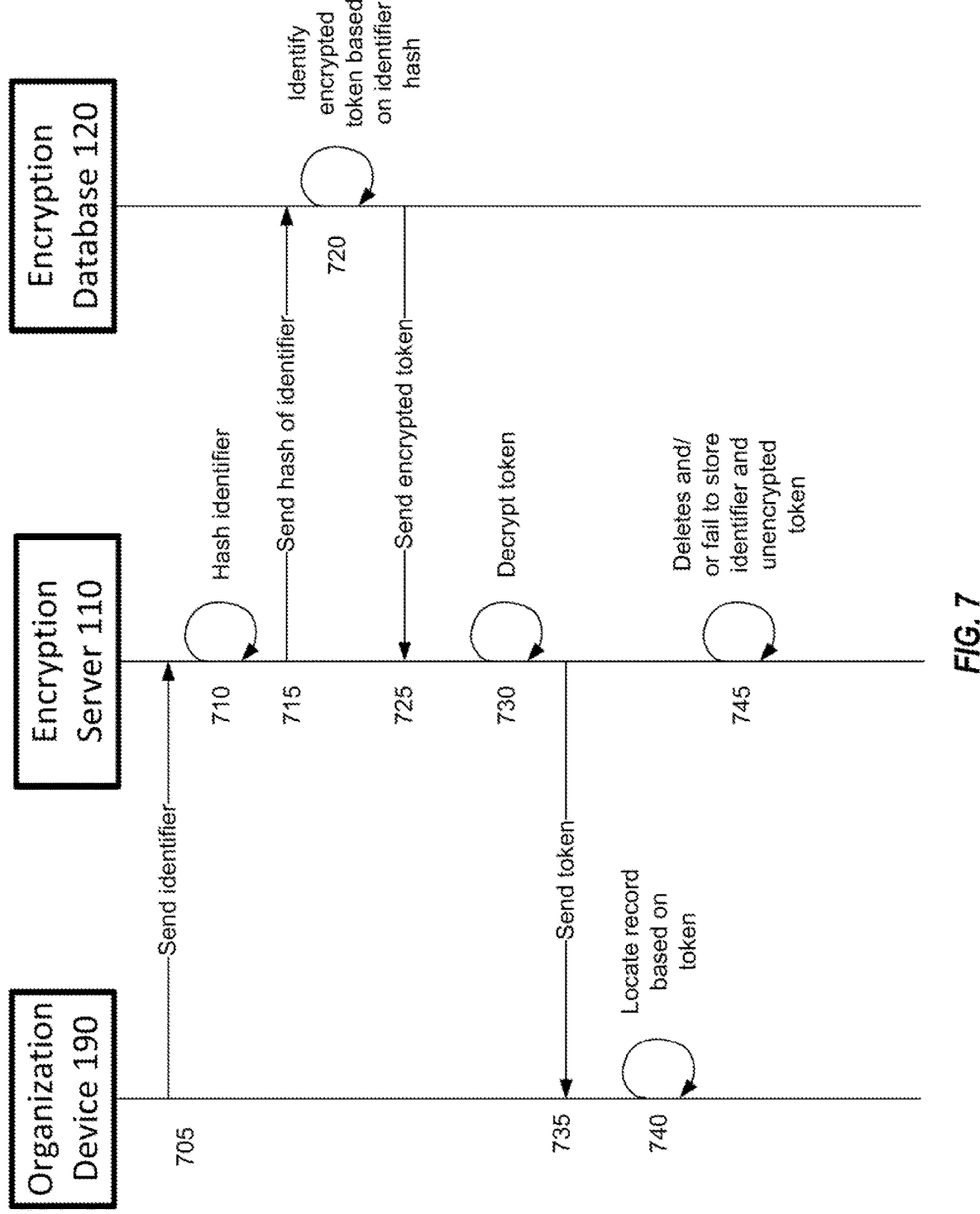
FIG. 7 is a timing diagram illustrating aspects of the present disclosure.

FIG. 7 is a timing diagram 700 of a data access method according to an example embodiment. Organization device 190 sends 705 an identifier to encryption server 110. Encryption server 110 generates 710 a hash of the identifier and sends 715 the identifier hash to encryption database 120. Additionally or alternatively, a key (e.g., password) may be provided by organization device 190 which may be used as a hash key and/or combined with the identifier to generate the hash. Encryption database 120 uses the identifier hash (e.g., as a database key) to identify 720 an encrypted token related to the identifier. Encryption database 120 sends 725 the encrypted token to encryption server 110.

Encryption server 110 decrypts 730 the token. For example, the identifier may serve as a decryption key for the encrypted token. Additionally or alternatively, an identifier of organization device 190 may be used as an encryption key. For example, an IP address or unique identifier of organization device 190 that cannot be easily assumed by a malicious actor could be used to decrypt that token. Additionally or alternatively, a key (e.g., password) may be provided by organization device 190 which may be used as an encryption key.

Encryption server 110 sends 735 the token to organization device 190, which can identify the record in its database related to the token, which is, in turn, related to the identifier. Once it is no longer needed, organization device may delete the token and all references to the token. Similarly encryption server 110 may delete 745 all copies of the token, the identifier, and/or the password from its systems.

As a non-limiting example, the identifier may be a username (e.g., "miragedatamaster") associated with a user account of organization device 190. Organization device 190 passes the username to encryption server 110 in order to locate the user data associated the username is in its database. Encryption server 110 uses this username ("miragedatamaster") and, optionally, more data (such as a key or password) to add more entropy to the encryption/hash process. Encryption server 110 hashes this username and sends the hash to encryption database 120 to find the record in encryption database 120. Encryption server 110 can then use the username, and, potentially a key/password, to decrypt the row in encryption database 120 identified by the hash. The decryption yields a token that is not logically related to the username (i.e., the token's assignment may be random or pseudorandom). The token is then passed to organization device 190. Organization device 190 uses the token to find the relevant user information in its database. Accordingly, as there is no logical relationship between the username and the data location within the database, it limits the ability of directly leveraging user names to gain access to a user account.

In some cases, additional user information can be stored in encryption database 120 along with the token. For example, user contact information, such as an email address or phone number, or other sensitive information, such as an account number, can be stored in encryption database 120 so as to protect the data from malicious actors with access to the organization device 190 or encryption server 110. Organization device 190 may temporarily replace redacted fields within the user account with this additional user information provided from encryption database 120.

According to aspects of the present disclosure, the approach protects every record of data with its own independent key, making a breach more difficult to execute as each record would need to be independently brute forced.

Figure 8:
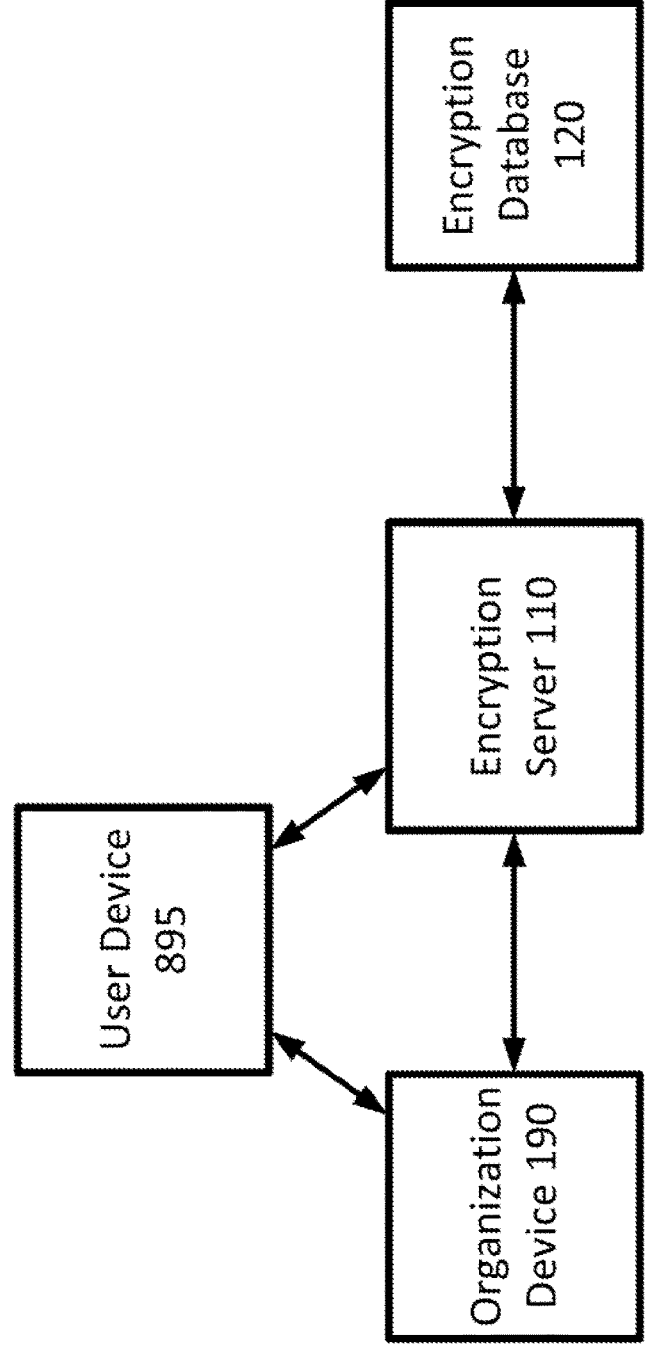
FIG. 8 illustrates an example environment in which one or more aspects of the present disclosure may be implemented.

FIG. 8 illustrates an example environment 800 in which one or more aspects of the present disclosure may be implemented. The example environment includes user device 895 in addition to encryption server 110, encryption database 120, and organization device 190. One or more of encryption server 110, encryption database 120, organization device 190, and user device 895 may be implemented within one or more computer system architectures, for example, as described below with reference to FIG. 10. Encryption server 110, encryption database 120, and organization device 190 may generally function somewhat similarly as discussed above with reference to FIGS. 1-7.

User device 895 may communicate with organization device 190 and/or encryption server 110. User device 895 may be controlled by a user of organization device 190. For example, the user may have a user account associated with organization device 190. When the user desires to log into its account, it may submit a username and/or password to organization device 190. Organization device 190 may provide the username and/or password to encryption server 110 in order to receive a token indicated where in organization device's databases the user account data associated with the user is located.

In some cases, user device 895 may provide a key (e.g., password) to encryption server 110. Encryption server 110 can use the key (e.g., together with the username) to generate a hash to send to encryption database 120. Additionally and/or alternatively, the key may be used to decrypt an encrypted token received by encryption server 110 from encryption database 120.

In some cases, encryption database 120 may also store a hash of the OUD and an encrypted form of the TED. When an email is sent to the organization, it may be received by encryption server 110. Encryption server 110 may receive the email, identify the OUD, and hash the OUD to identify the encrypted TED within encryption database 120. Utilizing the OUD or some other key, encryption server 110 decrypts the TED, replaces the OUD within the email with the TED, and forwards the email to the organization device 190. All traces of the OUD may be removed from the email prior to sending to the organization device 190.

Figure 9:
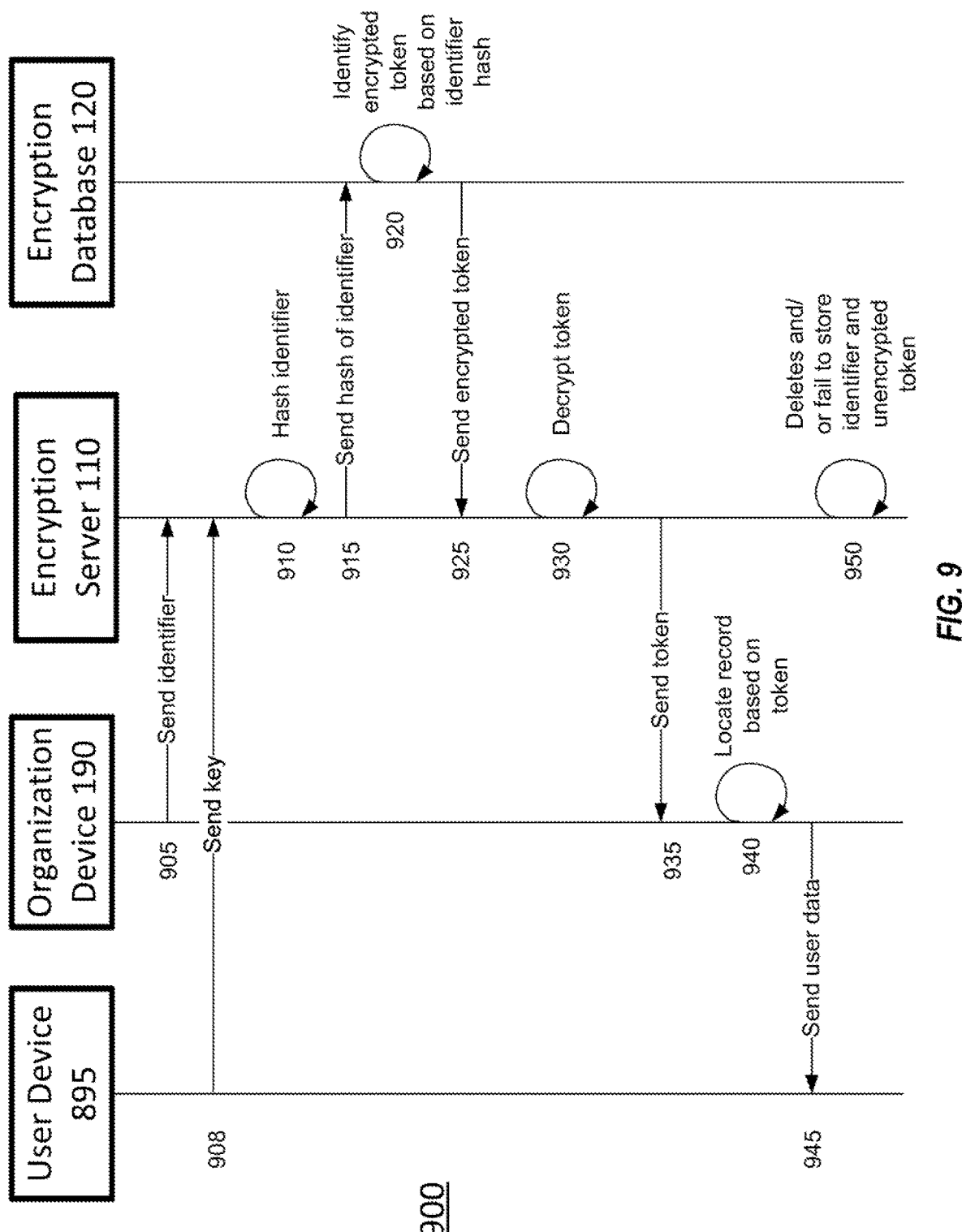
FIG. 9 is a timing diagram illustrating aspects of the present disclosure.

FIG. 9 is a timing diagram 900 of a data access method according to an example embodiment. Organization device 190 sends 905 an identifier to encryption server 110. Similarly, user device 895 sends 908 a key (e.g., password) to encryption server 110. In some cases, user device 895 may previously send the identifier to organization device 190 (e.g., as part of a login process). Encryption server 110 generates 910 a hash of the identifier and sends 915 the identifier hash to encryption database 120. Additionally or alternatively, the key may be used as a hash key and/or combined with the identifier to generate the hash. Encryption database 120 uses the identifier hash (e.g., as a database key) to identify 920 an encrypted token related to the identifier. Encryption database 120 sends 925 the encrypted token to encryption server 110.

Encryption server 110 decrypts 930 the token. For example, the identifier may serve as a decryption key for the encrypted token. Additionally or alternatively, an identifier of organization device 190 and/or user device 895 may be used as an encryption key. For example, an IP address or unique identifier of organization device 190 or user device 895 that cannot be easily assumed by a malicious actor could be used to decrypt that token. Additionally or alternatively, the key received from user device 895 may be used as a decryption key for the token.

Encryption server 110 sends 935 the token to organization device 190, which can identify the record in its database related to the token, which is, in turn, related to the identifier. For example, the record could be a user account that a user of user device 895 desires to access. Organization device 190 may provide 945 the user data to user device 895. Once it is no longer needed, organization device may delete the token and all references to the token. Similarly encryption server 110 may delete 950 all copies of the token, the identifier, and/or the password from its systems.

In some cases, additional user information can be stored in encryption database 120 along with the token. For example, user contact information, such as an email address or phone number, or other sensitive information, such as an account number, can be stored in encryption database 120 so as to protect the data from malicious actors with access to the organization device 190 or encryption server 110. Organization device 190 may temporarily replace redacted fields within the user data with this additional user information provided from encryption database 120, and provide this unredacted user data to user device 895. Once the unredacted user data is no longer needed (e.g., the user's account session closes or expires), organization device 190 may purge/delete all copies of the unredacted user data from its systems.

According to aspects of the present disclosure, the approach protects every record of data with its own independent key, making a breach more difficult to execute as each record would need to be independently brute forced.

Figure 10:
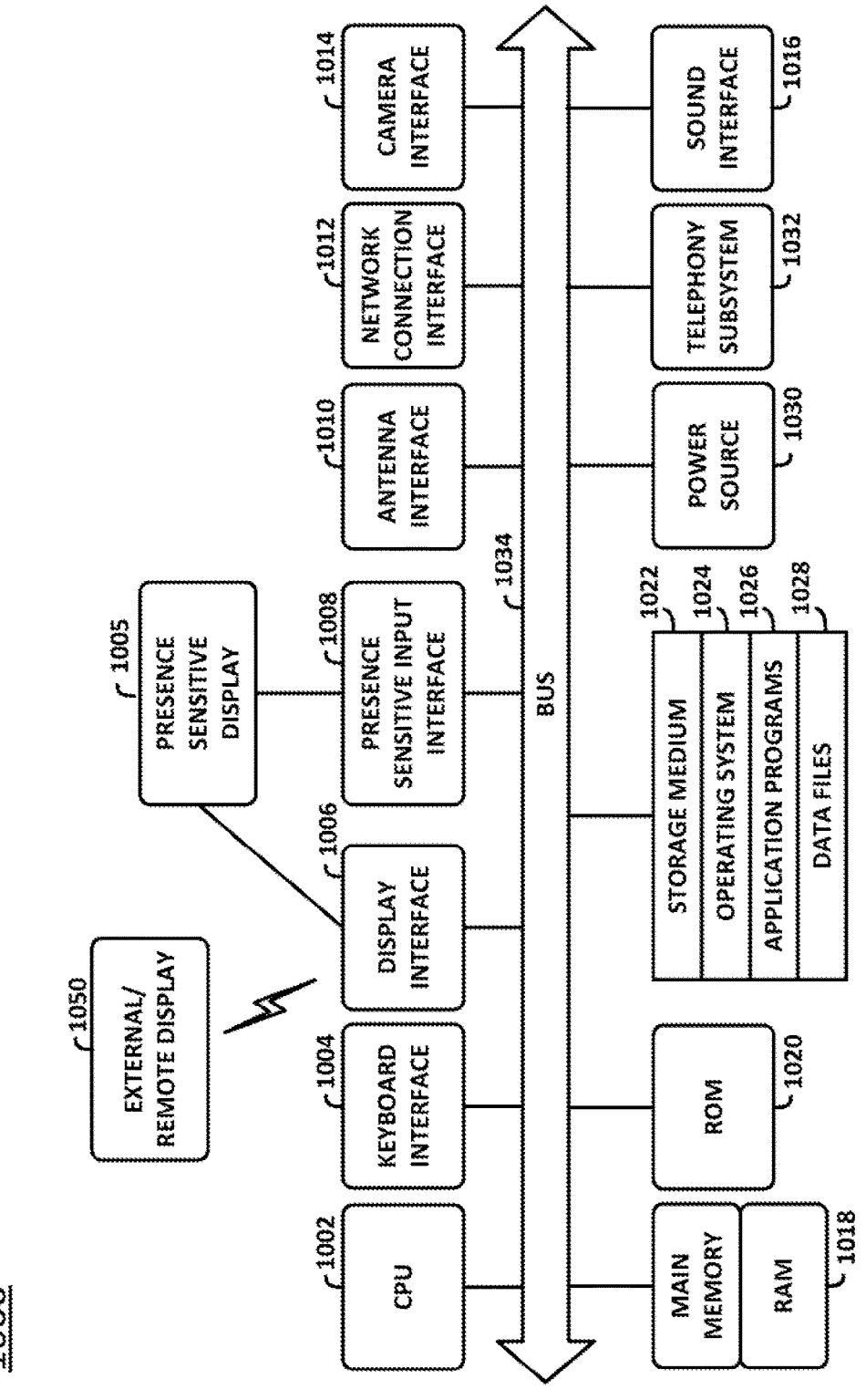
FIG. 10 is a block diagram of an illustrative computer system architecture, according to an example implementation.

FIG. 10 is a block diagram of an illustrative computer system architecture 1000, according to an example implementation. The computer system architecture 1000 may be used to implement one or more example embodiments within the scope of the present disclosure. In some cases, one or more elements of the computer system architecture 1000 may be combined to embody one or more of encryption server 110, an encryption database 120, an organization device 190, and a third party device 1085. It will be understood that the computing device architecture 1000 is provided for example purposes only and does not limit the scope of the various implementations of the present disclosed systems, methods, and computer-readable mediums.

The computing device architecture 1000 of FIG. 10 includes a central processing unit (CPU) 1002, where computer instructions are processed, and a display interface 1004 that acts as a communication interface and provides functions for rendering video, graphics, images, and texts on the display. In certain example implementations of the disclosed technology, the display interface 1004 may be directly connected to a local display, such as a touch-screen display associated with a mobile computing device. In another example implementation, the display interface 1004 may be configured for providing data, images, and other information for an external/remote display 1050 that is not necessarily physically connected to the mobile computing device. For example, a desktop monitor may be used for mirroring graphics and other information that is presented on a mobile computing device. In certain example implementations, the display interface 1004 may wirelessly communicate, for example, via a Wi-Fi channel or other available network connection interface 1012 to the external/remote display 1050.

In an example implementation, the network connection interface 1012 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 1004 may be operatively coupled to a local display, such as a touch-screen display associated with a mobile device. In another example, the display interface 1004 may be configured to provide video, graphics, images, text, other information, or any combination thereof for an external/remote display 1050 that is not necessarily connected to the mobile computing device. In one example, a desktop monitor may be used for mirroring or extending graphical information that may be presented on a mobile device. In another example, the display interface 1004 may wirelessly communicate, for example, via the network connection interface 1012 such as a Wi-Fi transceiver to the external/remote display 1050.

The computing device architecture 1000 may include a keyboard interface 1006 that provides a communication interface to a keyboard. In one example implementation, the computing device architecture 1000 may include a presence-sensitive display interface 1008 for connecting to a presence-sensitive display 1005. According to certain example implementations of the disclosed technology, the presence-sensitive display interface 1008 may provide a communication interface to various devices such as a pointing device, a touch screen, a depth camera, etc. which may or may not be associated with a display.

The computing device architecture 1000 may be configured to use an input device via one or more of input/output interfaces (for example, the keyboard interface 1006, the display interface 1004, the presence sensitive display interface 1008, network connection interface 1012, camera interface 1014, sound interface 1016, etc.) to allow a user to capture information into the computing device architecture 1000. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 1000 or may be a separate device. For example, the input device may be an accelerometer, a magnetometer, a digital camera, a microphone, and an optical sensor.

Example implementations of the computing device architecture 1000 may include an antenna interface 1010 that provides a communication interface to an antenna; a network connection interface 1012 that provides a communication interface to a network. As mentioned above, the display interface 1004 may be in communication with the network connection interface 1012, for example, to provide information for display on a remote display that is not directly connected or attached to the system. In certain implementations, a camera interface 1014 is provided, which acts as a communication interface and provides functions for capturing digital images from a camera. In certain implementations, a sound interface 1016 is provided as a communication interface for converting sound into electrical signals using a microphone and for converting electrical signals into sound using a speaker. According to example implementations, a random-access memory (RAM) 1018 is provided, where computer instructions and data may be stored in a volatile memory device for processing by the CPU 1002.

According to an example implementation, the computing device architecture 1000 includes a read-only memory (ROM) 1020 where invariant low-level system code or data for basic system functions such as basic input and output (I/O), startup, or reception of keystrokes from a keyboard are stored in a non-volatile memory device. According to an example implementation, the computing device architecture 1000 includes a storage medium 1022 or other suitable type of memory (e.g., such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 1024, application programs 1026 (including, for example, a web browser application, a widget or gadget engine, and or other applications, as necessary) and data files 1028 are stored. According to an example implementation, the computing device architecture 1000 includes a power source 1030 that provides an appropriate alternating current (AC) or direct current (DC) to power components.

According to an example implementation, the computing device architecture 1000 includes a telephony subsystem 1032 that allows the device 1000 to transmit and receive sound over a telephone network. The constituent devices and the CPU 1002 communicate with each other over a bus 1034.

According to an example implementation, the CPU 1002 has appropriate structure to be a computer processor. In one arrangement, the CPU 1002 may include more than one processing unit. The RAM 1018 interfaces with the computer bus 1034 to provide quick RAM storage to the CPU 1002 during the execution of software programs such as the operating system application programs, and device drivers. More specifically, the CPU 1002 loads computer-executable process steps from the storage medium 1022 or other media into a field of the RAM 1018 in order to execute software programs. Data may be stored in the RAM 1018, where the data may be accessed by the computer CPU 1002 during execution.

The storage medium 1022 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 1022, which may include a machine-readable storage medium.

According to one example implementation, the term computing device, as used herein, may be a CPU, or conceptualized as a CPU (for example, the CPU 1002 of FIG. 10). In this example implementation, the computing device (CPU) may be coupled, connected, and/or in communication with one or more peripheral devices, such as display. In another example implementation, the term computing device, as used herein, may refer to a mobile computing device such as a smart phone, tablet computer, or smart watch. In this example implementation, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

According to some implementations, computer program code may be configured to control a computer device, e.g., the computer system architecture 1000, to implement one or more components of one or more embodiments. According to some implementations, computer program code may be configured to control a computer device implement one or more methods within the scope of the present disclosure.

An embodiment of the present disclosure may be implemented according to at least the following:

Clause 1: A system configured to: accept a data field from a calling service, application, or user; and generate a token or replacement data field for use by the calling service instead of the actual data field.

Clause 2: The system of Clause 1, wherein the data field comprises at least one from among an email address, a telephone number, and a physical address.

Clause 3: A system configured to generate a token or replacement data field on demand.

Clause 4: The system of Clause 3, wherein the data field comprises at least one from among an email address, a telephone number, and a physical address.

Clause 5: The system of any of any of Clauses 1-4 further configured to generate the token or replacement data field not externally connected to any other data field.

Clause 6: The system of Clause 5 further configured to generate the token or replacement email address that is not externally connected to any other email address.

Clause 7: The system of any of Clauses 1-6, wherein the token or replacement data field associates the replacement email address to the actual data field.

Clause 8: The system of Clause 7, wherein the token or replacement email address associates the replacement email address to the actual email address.

Clause 9: The system of Clause 8 further configured to receive an email addressed to the token address and forward the email to the actual email address.

Clause 10: The system of any of Clauses 1-9 further configured to map the data field to a row in a database using an encryption algorithm.

Clause 11: The system of any of Clauses 1-10 further configured to map a piece of data to a row in a database using an encryption algorithm.

Clause 12: The system any of Clauses 1-11 further configured to map an email address to a row in a database using a hashing algorithm.

Clause 13: The system of any of Clauses 1-12 further configured to map a piece of data to a row in a database using a hashing algorithm.

Clause 14: The system of any of Clauses 1-13 further configured to store an email address associated with a token within a row of a database using an encryption algorithm.

Clause 15: The system of any of Clauses 1-14 further configured to store one or more pieces of data associated with a token within a row of a database using an encryption algorithm.

Clause 16: The system of any of Clauses 1-15 further configured to store one or more pieces of structured data associated with a token within a row of a database using an encryption algorithm.

Clause 17: The system of any of Clauses 1-16 further configured to store one or more pieces of unstructured data associated with a token within a row of a database using an encryption algorithm.

Clause 18: The system of any of Clauses 1-17 further configured to provide data back to the calling service, application, or user after looking up a token in an encrypted database using an encryption algorithm.

Clause 19: A method of a device comprising: receiving, from a remote device, original data to be encrypted; generating a replacement token for the original data; sending, to the remote device, the replacement token; encrypting the original data; and storing the encrypted original data in association with the replacement token.

Clause 20: The method of Clause 19 further comprising generating a hash of the replacement token, wherein the encrypted original data is stored in association with the hash of the replacement token.

Clause 21: The method of Clause 20, wherein the device does not store the unencrypted original data or the unhashed replacement token.

Clause 22: The method of any of Clauses 19-21, wherein the original data is encrypted based on the replacement token.

Clause 23: A method of a device comprising: receiving, from a remote device, a replacement token to be de-obfuscated; identifying an encrypted original data based on the replacement token; decrypting the original data; and sending, to the remote device, the original data.

Clause 24: The method of Clause 23 further comprising generating a hash of the replacement token, wherein the encrypted original data is identified based on the hash of the replacement token.

Clause 25: The method of Clause 23 or Clause 24, wherein the encrypted original data is decrypted based on the replacement token.

Clause 26: A method of a device comprising: receiving, from a remote device, an email directed to a token email address; identifying an encrypted true email address based on the token email address; decrypting the true email address; updating the email by replacing, within the email, the token email address with the email address; and forwarding the updated email to the true email address.

Clause 27: The method of Clause 26 further comprising generating a hash of token email address, wherein the encrypted true email address is identified based on the hash of the token email address.

Clause 28: The method of Clause 26 or Clause 27, wherein the encrypted true email address is decrypted based on the token email address.

Clause 29: A method of a device comprising: receiving, from a remote device, an identifier to be de-obfuscated; identifying an encrypted token based on the identifier; decrypting the token; and sending, to the remote device, the unencrypted token.

Clause 30: The method of Clause 29 further comprising generating a hash of the identifier, wherein the encrypted token is identified based on the hash of the identifier.

Clause 31: The method of Clause 30, wherein the encrypted token is decrypted based on the identifier and a key.

Clause 32: The method of Clause 31, wherein the key is provided by the remote device.

Clause 33: The method of Clause 31, wherein the key is provided by the second remote device.

Clause 34: The method of Clause 33, wherein the second remote device is associated with a user having an account associated with the remote device.

Clause 35: The method of any of Clauses 29-34, wherein the encrypted token is decrypted based on the identifier.

Clause 36: The method of any of Clauses 28-35, wherein the encrypted token is decrypted based on a decryption key.

Clause 37: The method of Clause 36, wherein the decryption key is provided by the remote device.

Clause 38: The method of Clause 36, wherein the decryption key is provided by the second remote device.

Clause 39: The method of Clause 38, wherein the second remote device is associated with a user having an account associated with the remote device.

Clause 40: The method of any of Clauses 29-39, wherein the token corresponds to a location of data accessible by the remote device that is associated with the identifier.

Clause 41: The method of Clause 40, wherein the data corresponds to a user account associated with the identifier.

Clause 42: The method of any of Clauses 29-41 further comprising: identifying encrypted user data on the identifier; and decrypting the user data.

Clause 43: The method of Clause 42 further comprising sending, to the remote device, the unencrypted user data.

Clause 44: The method of Clause 42 or Clause 43, wherein the user data comprises at least one from among an email address, a telephone number, a physical address, and an account number.

Clause 45: The method of any one of Clauses 42-44, wherein the remote device is configured to temporarily replace redacted fields within a user account with the user data received from the device.

Clause 46: A system comprising: a processor; and a memory having stored thereon computer program code configured to control the processor to execute the method of any of Clauses 19-45.

Clause 47: A non-transitory computer readable medium having stored thereon instructions that, when executed by a processor, instruct the processor to execute the method of any of Clauses 19-45.

Although some example embodiments described herein have been described in language specific to computer structural features, methodological acts, and by computer readable media (e.g., non-transitory computer readable media), it is to be understood that the disclosure is not necessarily limited to the specific structures, acts or media described. Therefore, the specific structural features, acts and mediums are disclosed as example embodiments implementing the disclosure. The present disclosure is intended to cover various modifications and equivalent arrangements including those within the scope of the appended claims and their equivalents. Although specific terms are employed herein, they are used in a generic and descriptive sense only and not for purposes of limitation.

Although example embodiments of the present disclosure described herein are explained in detail, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Moreover, titles or subtitles may be used in this specification for the convenience of a reader, which shall have no influence on the scope of the present disclosure.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, certain terminology has been resorted to for the sake of clarity. It is intended that each term contemplates its broadest meaning as understood by those skilled in the art and includes all technical equivalents that operate in a similar manner to accomplish a similar purpose.

It is to be understood that the mention of one or more steps or blocks of a method does not preclude the presence of additional method steps or intervening method steps between those steps expressly identified. Steps of a method may be performed in a different order than those described herein. Similarly, it is also to be understood that the mention of one or more components in a device or system does not preclude the presence of additional components or intervening components between those components expressly identified.

What is claimed is:

1. A method of a device comprising:
   receiving, from a remote device, original data to be encrypted;
   generating a replacement token for the original data;
   sending, to the remote device, the replacement token;
   generating a hash of the replacement token;
   encrypting the original data; and
   storing, using a database, the encrypted original data in association with the replacement token and the hash of the replacement token,
   wherein:
   the hash of the replacement token links the encrypted original data with the replacement token without requiring knowledge of the replacement token; and
   the device does not store the original data or the replacement token.

2. The method of claim 1, wherein the original data is encrypted based on the replacement token.

3. The method of claim 1 further comprising:
   receiving, from the remote device, a replacement token to be de-obfuscated;
   identifying an encrypted original data based on the replacement token; decrypting the original data; and
   sending, to the remote device, the original data.

4. The method of claim 3 further comprising generating a hash of the replacement token, wherein the encrypted original data is identified based on the hash of the replacement token.

5. The method of claim 3, wherein the encrypted original data is decrypted based on the replacement token.

6. A method of a device comprising:

receiving, from a remote device, an identifier to be de-obfuscated;

generating a hash of the identifier;

identifying, using a database, an encrypted token based on the hash of the identifier;

decrypting the token; and sending, to the remote device, the unencrypted token, wherein the device does not store the identifier received from the remote device or the unencrypted token.

7. The method of claim 6, wherein the encrypted token is decrypted based on the identifier and a key.

8. The method of claim 7, wherein the key is provided by the remote device.

9. The method of claim 7, wherein the key is provided by a second remote device, and wherein the second remote device is associated with a user having an account associated with the remote device.

10. The method of claim 6, wherein the encrypted token is decrypted based on the identifier.

11. The method of claim 6, wherein the encrypted token is decrypted based on a decryption key.

12. The method of claim 6, wherein the token corresponds to a location of data accessible by the remote device that is associated with the identifier.

13. The method of claim 12, wherein the data corresponds to a user account associated with the identifier.

14. The method of claim 6 further comprising:

identifying encrypted user data on the identifier; and decrypting the user data.

15. The method of claim 1, wherein the hash of the replacement token converts the replacement token to a numerical or alphanumerical representation.

16. The method of claim 6, wherein the hash of the identifier converts the identifier to a numerical or alphanumerical representation.

* * * * *